United States Patent
Ertel

(10) Patent No.: US 7,900,093 B2
(45) Date of Patent: Mar. 1, 2011

(54) ELECTRONIC DATA PROCESSING SYSTEM AND METHOD FOR MONITORING THE FUNCTIONALITY THEREOF

(75) Inventor: Emilian Ertel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 474 days.

(21) Appl. No.: 12/030,248

(22) Filed: Feb. 13, 2008

(65) Prior Publication Data

US 2008/0222457 A1 Sep. 11, 2008

(30) Foreign Application Priority Data

Feb. 13, 2007 (DE) ........................ 10 2007 007 115

(51) Int. Cl.
G06F 11/00 (2006.01)
(52) U.S. Cl. ........................................................ 714/41
(58) Field of Classification Search .................... 714/41
See application file for complete search history.

(56) References Cited

U.S. PATENT DOCUMENTS

| 4,999,837 | A | 3/1991 | Reynolds et al. | |
|---|---|---|---|---|
| 6,457,146 | B1* | 9/2002 | Keen et al. | 714/48 |
| 6,560,720 | B1* | 5/2003 | Chirashnya et al. | 714/32 |
| 6,662,217 | B1* | 12/2003 | Godfrey et al. | 709/219 |
| 6,718,486 | B1* | 4/2004 | Roselli et al. | 714/41 |
| 7,165,189 | B1* | 1/2007 | Lakkapragada et al. | 714/31 |
| 7,707,458 | B2* | 4/2010 | Miller et al. | 714/25 |
| 2005/0102567 | A1 | 5/2005 | McGuire et al. | |
| 2007/0192400 | A1 | 8/2007 | Lee et al. | |
| 2008/0215925 | A1* | 9/2008 | Degenaro et al. | 714/41 |

FOREIGN PATENT DOCUMENTS

GB  2 346 461  8/2000

OTHER PUBLICATIONS

Stott et al., "NFTAPE: A Framework for Assessing Dependability in Distributed Systems with Lightweight Fault Injectors", 2000, Proceedings of the 4th International Computer Performance and Dependability Symposium.*

Chandra et al., "A Global-State-Triggered Fault Injector for Distributed System Evaluation", Jul. 2004, IEEE Transactions on Parallel and Distributed Systems.*

Jacques-Silva et al., "A Network-level Distributed Fault Injector for Experimental Validation of Dependable Distributed Systems", 2006, Proceedings of the 30th Annual Computer Software and Applications Conference.*

* cited by examiner

*Primary Examiner* — Gabriel L Chu
(74) *Attorney, Agent, or Firm* — Schiff Hardin LLP

(57) ABSTRACT

A method for monitoring of the functionality of an EDP system that is monitored in portions thereof by respectively associated agents that are designed to evaluate errors and to send error messages should increase the operating security in an EDP system. Each agent is monitored by a simulated error being sent to the agent and the reaction of the agent being evaluated.

9 Claims, 5 Drawing Sheets

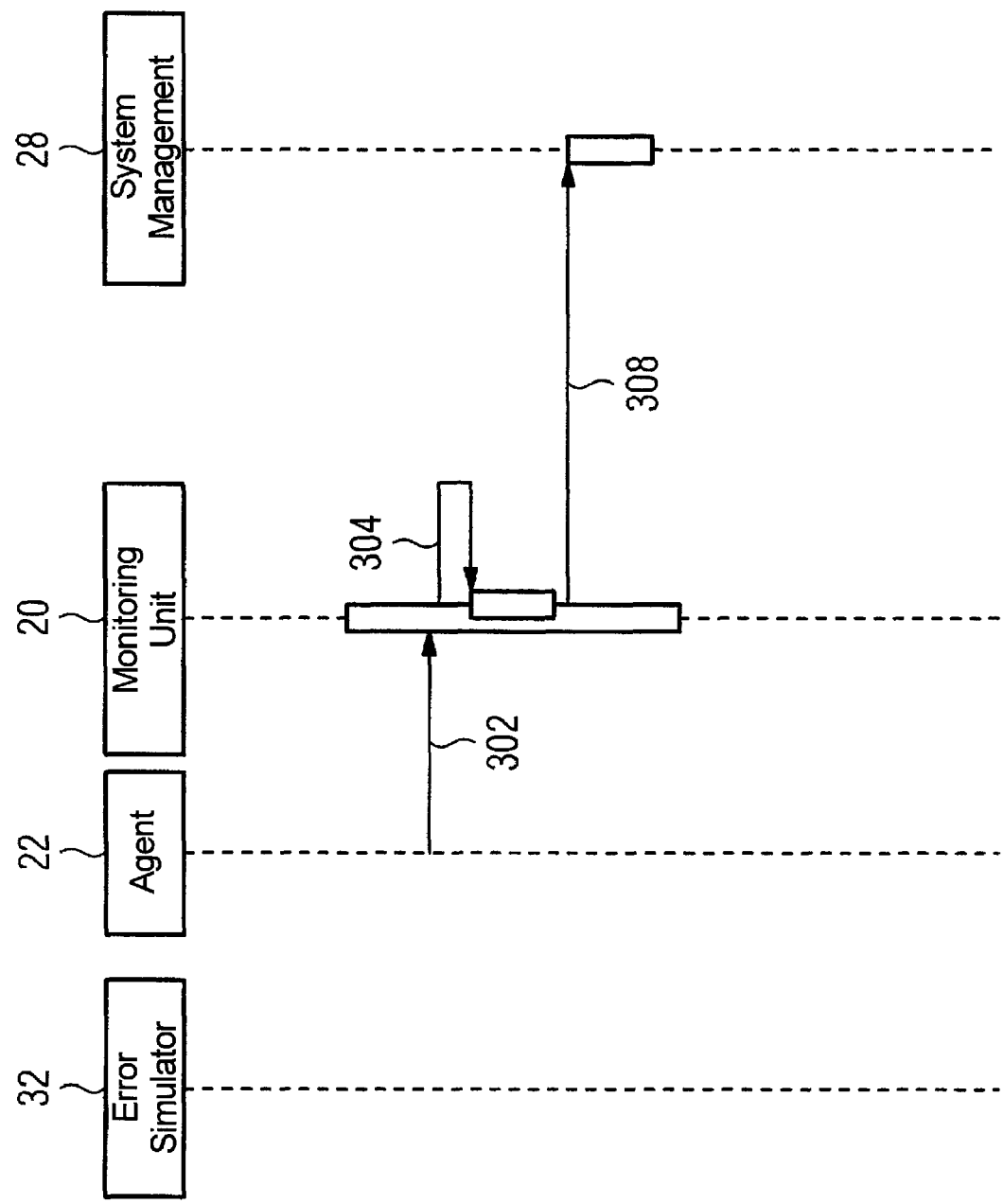

US 7,900,093 B2

ELECTRONIC DATA PROCESSING SYSTEM AND METHOD FOR MONITORING THE FUNCTIONALITY THEREOF

BACKGROUND OF THE INVENTION

1. Field of the Invention

The present invention concerns a method for monitoring the functionality of an electronic data processing (EDP) system that is monitored in portions thereof by respectively associated agents that are designed to evaluate errors and to send error messages.

2. Description of the Prior Art

An EDP system typically has a number of components that interact with one another such that the overall system fulfills the relevant requirements in as optimal a design as possible. A number of servers as well as a number of workstations or job-specific specialized modules, that exhibit local intelligence and that obtain their data centrally from the server and store data, typically are among the components, in particular in a network.

Entire or partial processes to be executed can be associated in terms of resources with a server, an individual workstation or module or even a cluster of computers belonging to a network, with the task distribution of the processes to the components typically ensuring under consideration of the respective computing expenditure in relation to the available processing time. During the operation of the EDP system, the control of the processes and their workflows as well as the introduction and monitoring of measures that are necessary for a proper course of the execution of the posted tasks are normally subject to an operating system with associated organization programs.

This operating system and/or the organization programs associated therewith as well as (if needed) individual components or modules with associated monitoring mechanisms that, among other things, check functional capabilities and report determined malfunctions in real time, are provided for high operational security and reliability of the EDP system. Specialized modules or program workflows (designated as agents) can be used in the framework of such monitoring mechanisms, these modules or program workflows being configured for the requirements that are relevant for the monitoring and control in a specific process workflow.

The reliable communication of such error messages, as well as the introduction of possible reactions or countermeasures, are essential to the operation management in complex systems. By contrast, if the reports of the agents about possible malfunctions cannot be transmitted, important information for assessment of the functionality of the total system is missing to the operating system and/or the organization programs associated with it. In such a case the system or programs are not able to administer and/or to control the EDP system as required. A failure of such agents thus can significantly detrimentally affect the operating security and reliability of the entire EDP system.

SUMMARY OF THE INVENTION

An object of the invention is to provide a method for monitoring the functionality of an EDP system of the aforementioned type such that the operating security of the EDP system is further increased. A further object is to provide an EDP system that is particularly suitable for implementation of the method.

The above object is achieved in accordance with the invention by a monitoring method wherein each agent is monitored by a simulated error being sent to the agent and the reaction of the agent being evaluated.

In accordance with the present invention, each agent (that is in turn subject to monitoring) monitors a functional entity of the electronic data processing system. As used herein, "functional entity" encompasses individual components as well as groups of components, and individual processes as well as combinations of processes.

The invention proceeds from the recognition that all error sources should be consistently avoided to ensure a particularly high operating security. Among other things, it should be taken into account that the agents used for monitoring of processes and functions could themselves fail. In order to avoid to the greatest possible extent impairments of the workflows resulting from this situation, the agents should be monitored for proper function by suitable monitoring measures. The capacity of the EDP system should not be significantly reduced by the control and monitoring functions. By the dispatch of the simulated error to the respective agent, without further impairment of the other system functions the agent can be checked in a targeted and controlled manner as to whether it also actually shows the expected and appropriate reaction to the error, or whether this reaction does not occur. In this case a failure of the respective agent is then assumed.

In particular a number of agents that respectively monitor different processes, and thus are also structured and configured differently, are used in an EDP system. In order to handle the consistent computation, a simulated error that serves to check the function of an agent is appropriately generated such that it takes into account the specifications of the agent (such as runtime behavior of a process or a checksum calculation, for example) in order to be able to make a sufficiently correct conclusion about the functioning thereof.

In order to keep the resources necessary for evaluation of possible error messages as well as the administration for the evaluations (such as the updating of the stored data and the learning capability of the evaluation program, thus the adaptation of the evaluation criteria, for example) optimally low in the total system, a common evaluation module is advantageously associated with all agents of the EDP system.

In order to unburden the total system and to not unnecessarily limit the capacity of other processes, the evaluation module is advantageously designed for data transfer by the error messages that is kept particularly low. For this purpose, the evaluation module is appropriately designed such that it is able to make a differentiation between a simulated error and an actual error by a comparison with stored identification data. Using this differentiation, the relaying of error messages to the system management can be limited to actual errors, contrary to which simulated errors and the associated data transfer can be suppressed before a communication to the system management (as should ensue given an actual error) and the data associated with the simulated error can be discarded.

In a further embodiment, it is additionally taken into account that the absence of the expected reaction of the tested agent to the sending of the simulated error to said agent does not necessarily indicate an irreversibly damaged or faulty agent; rather, this agent may have been blocked, for example. To check this, given the absence of the expected reaction the agent is restarted by the system management so that a new function test is enabled.

So that, after such a restart of the respective agent (the restart having become necessary due to the absence of the expected reaction to the sending of a simulated error), a test can ensue as to whether the agent is a permanently faulty agent or whether it correctly operates again after the occurred restart, after the restart a simulated error is appropriately re-sent to the agent.

The testing of an agent for functionality can ensue in different time intervals. For example, a non-cyclical generation of simulated errors (controlled by a random generator) and their transmission to the agents is conceivable. However, a cyclical transmission of simulated errors to the agents is of particular advantage since an unloading of the system ensues relative to time intervals that are constantly to be re-calculated, which in particular can become noticeable given a large number of agents used. Furthermore, a better control of the agents is possible at cyclical time intervals since no random, large unmonitored time intervals occur between the tests.

With regard to the EDP system with a number of components whose interaction is determined via a number of operating systems and organization programs (wherein a number of agents that are respectively designed for monitoring a sub-region of the EDP system and for evaluation of errors and for sending of error messages are integrated into an organization program monitoring the proper functioning of the EDP system), the above object is achieved by the sending of a simulated error from a monitoring unit to the agent and the evaluation of the reaction of the respective agent.

The EDP system is advantageously designed in a client-server structure.

In order to keep the resource requirements in the agent monitoring particularly low and additionally also to enable a uniform and coordinated monitoring, the EDP system can have an evaluation module that is common to all, or at least multiple agents for evaluation of the error messages sent by the agents.

Among the advantages achieved with the invention are that, by the additional monitoring of the agents monitoring the system, malfunctions on the part of the agents that could impair the capability and operating security of the EDP system can be detected particularly quickly and reliably.

DESCRIPTION OF THE DRAWINGS

FIG. 5 schematically illustrates the correct reaction of an agent to an actual, non-simulated error.

DESCRIPTION OF THE PREFERRED EMBODIMENTS

Figure 1:
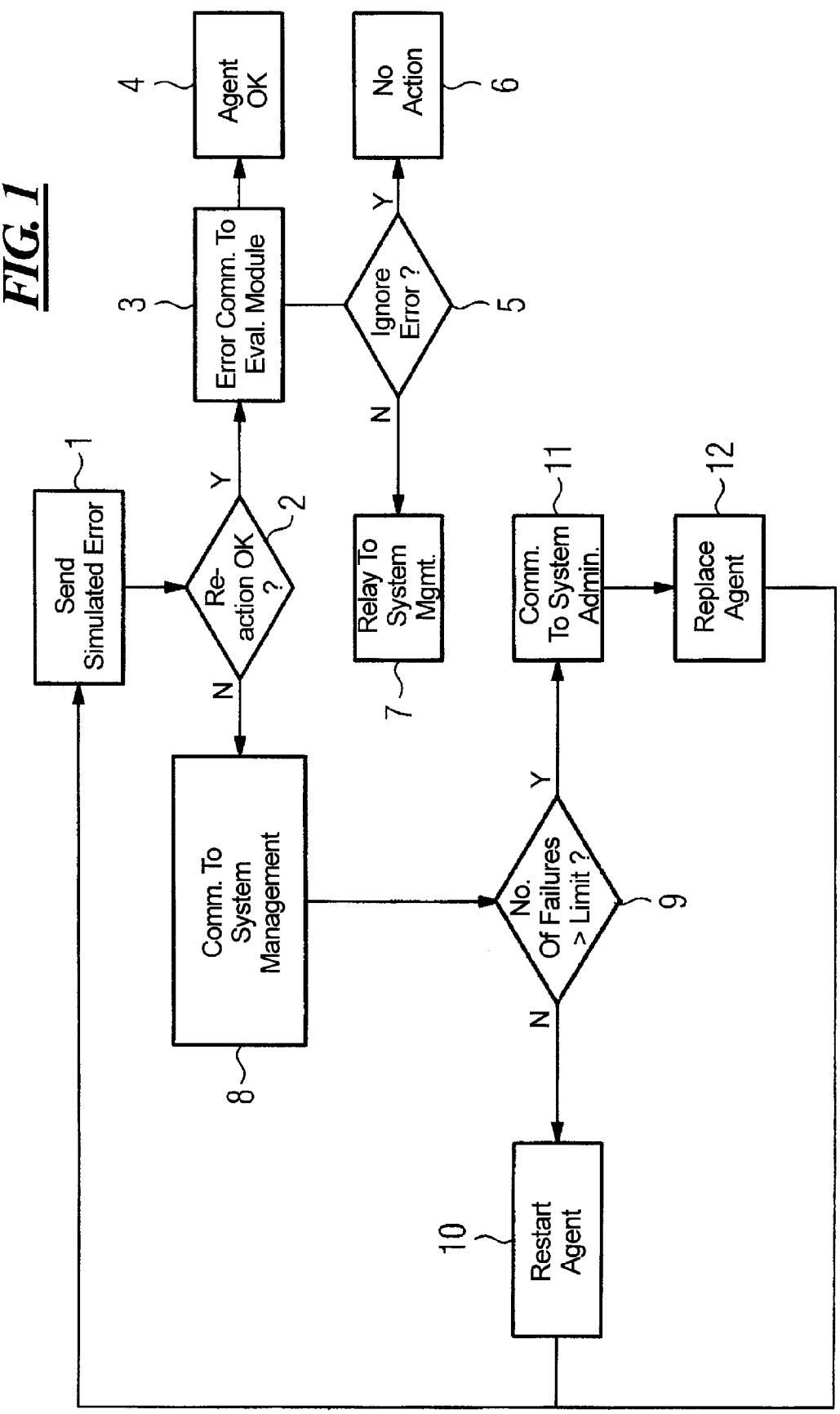
FIG. 1 is a flow chart of a monitoring method in accordance with the invention.

A simulated error matched to the respective agent to be tested is generated in step 1 of the method shown in FIG. 1 and is automatically sent to the respective associated agent at predetermined time intervals that can be cyclically or non-cyclically predetermined.

In step 2 it is evaluated and protocolled whether the sent error is detected by the agent and thus categorized and communicated as an error by the agent. If the result is positive (thus if the error is detected), in step 3 the agent communicates the error to the associated evaluation module. From this the conclusion is drawn in step 4 that the agent operates without error and as provided by the system.

Furthermore, in step 5 the check ensues as to whether the error detected by the agent is a simulated error that exclusively applies to the testing of the functionality of the agent and therefore is to be ignored by the evaluation module insofar as that no further measures are required (in particular no communication to the system management has to ensue, as shown in Step 6) or whether it is an actual error that requires an associated error relaying and the introduction of further measures.

If the test in step 5 indicates that it is not a simulated error deliberately generated to test the functionality of the agent, in step 7 a corresponding message is transmitted to the system management.

Each of the steps 5 through 7 contains the information that the agent operates without error. Therefore, a further measure by the system management as pertains to the agent is not provided in this region of the workflow. The step 1 is then repeated at predetermined time intervals.

If the result of the evaluation in step 2 is negative, thus if a simulated error sent to the agent is not detected by this and no corresponding message from the agent to an employed monitoring module ensues, in step 8 a communication is automatically generated and sent to the system management as a direct consequence of the absence of the error message on the part of the tested agent. This communication comprises the information that the agent exhibits functional deficiencies, thus operates incorrectly.

In step 9 an evaluation of the number of the automatically generated error messages regarding the operation of the agent (thus function failures) ensues. If their number lies in the range between one error message (thus one failure of the agent) and three failures, in a step 10 the agent is restarted via the system management, whereby the restart can comprise a preceding shutdown and/or a resetting of the settings to the default values.

After an occurred restart, the agent is again involved in the automatic monitoring routine; the monitoring process of the agent for functionality thus restarts with a repetition as of step 1.

If the evaluation of the failures of the agent in step 9 yields an error count greater than three, an automatic communication in this regard to the system administrator ensues in step 11 as a superordinate instance of the system management. The necessary consequence of a multiple breakdown of the agent detected in step 9, the replacement of the appertaining agent, ensues at the direction of the system administrator in step 12.

After replacement of the agent, the new agent is integrated into the monitoring routine that begins in step 1 with the automatic generation and sending of a simulated error matched to the agent to be tested.

Figure 2:
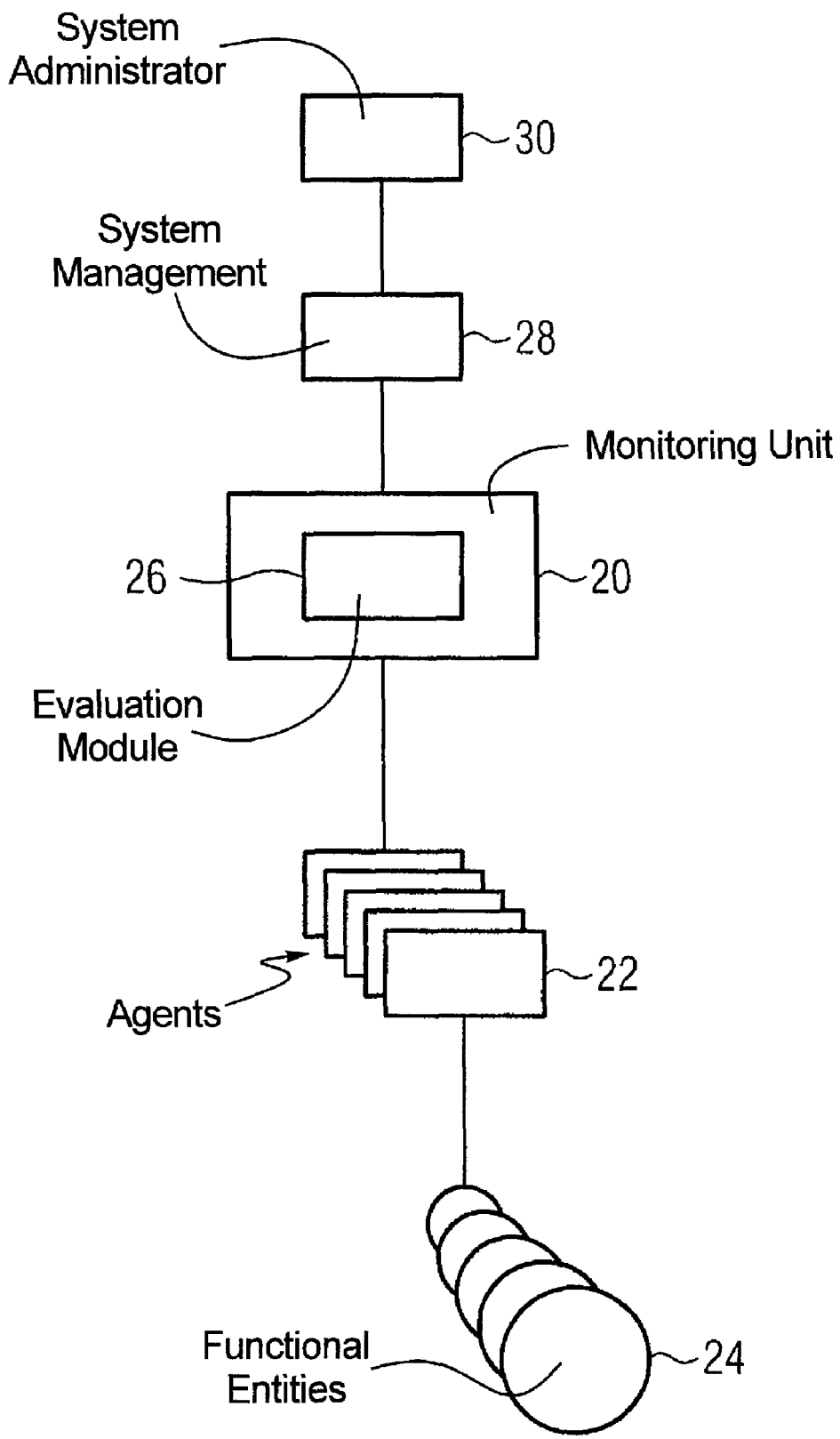
FIG. 2 illustrates the organization structure of an EDP system in accordance with the invention.

FIG. 2 shows the organization structure of the EDP system that that is monitored by the described method. A monitoring unit 20 generates a simulated error dependent on a number of specifications of an agent 22 and sends this to the associated agent 22. The monitoring unit has a suitable transmission module (not shown here). In the positive case the receiver of the simulated error (the agent 22) detects the error and sends a corresponding communication to a reception module (likewise not shown here) in the monitoring unit 20. The agent 22 proceeds in the same way with a detected actual error, which it communicates to the reception module of the monitoring unit 20 due to the monitoring of the functional entity 24.

The reception module internally relays the communication of the agent 22 to an evaluation module 26, wherein the evaluation module 26 makes the decision of whether the cause for the error message sent by the agent 22 is a simulated error or an actual error of one of the functional entities 24. If it is a simulated error, the evaluated module 26 exclusively detects a correctly operating agent 22 and introduces no further measures.

However, if it is an actual error that is detected by the evaluation module 26 based on the error message of the agent 22 monitoring the process 24, the evaluation module 26 relays this error message to the system management 28 via the monitoring unit 20 superordinate thereto. This system management 28 introduces further measures for error correction and/or for the further process workflow.

If a simulated error is sent from the monitoring unit 20 to the agent 22 via the transmission module and the expected reaction of the agent 22 does not appear at the reception module, a communication to the evaluation module 26 about the non-occurred reaction of the agent 22 ensues. The consequence ensuing from this is a restart of the appertaining agent 22 or, as of a number of more than three failures of the agent 22, a communication to the system administrator 30, who decides about a replacement of the agent 22 based on the present information.

Figure 3:
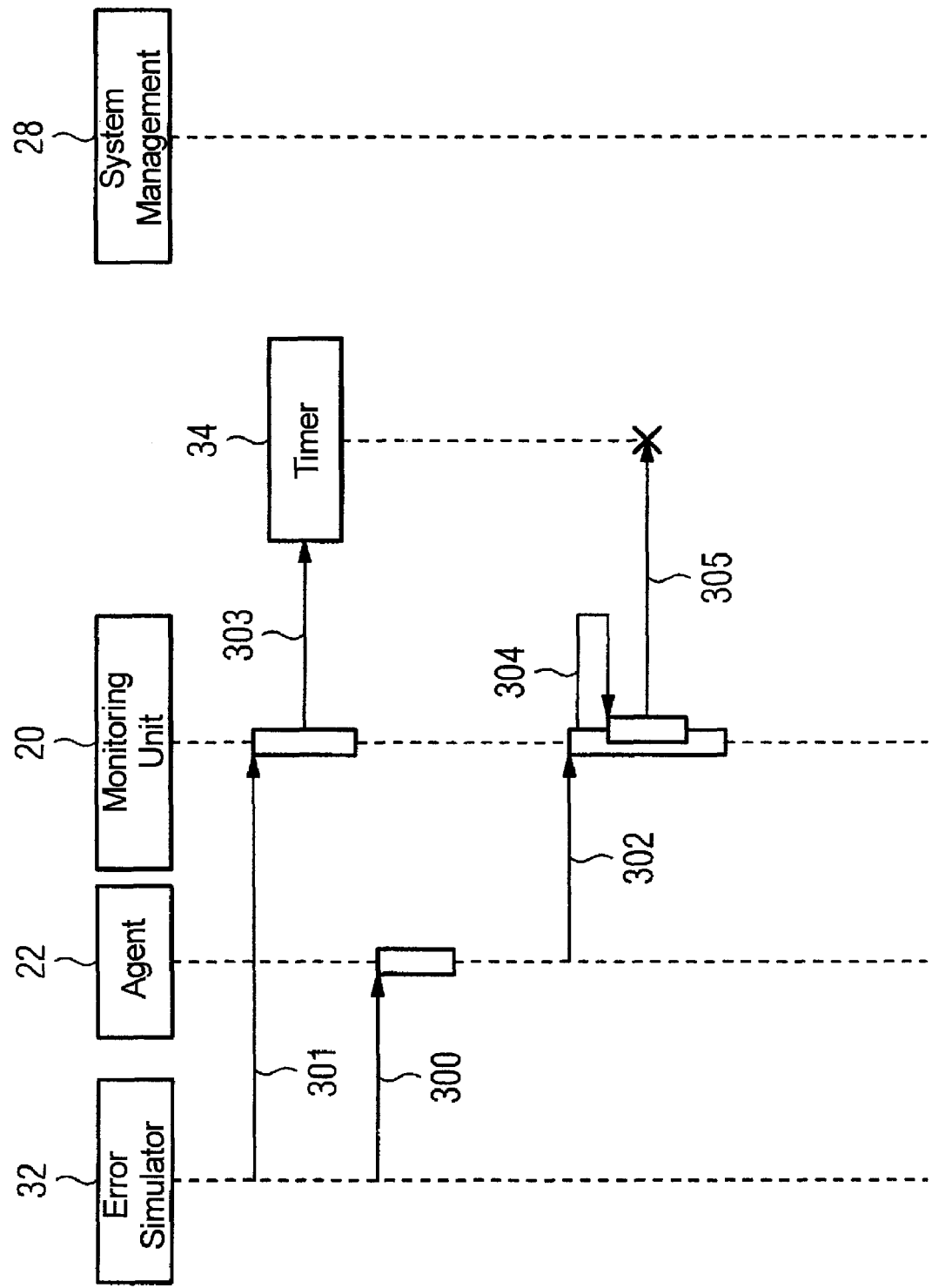
FIG. 3 schematically illustrates the correct reaction of an agent to a simulated error.

The reaction of an agent that reacts without error and detects and correctly processes a simulated error is shown in FIG. 3: the error simulator 32 sends a simulated error 300 to the agent 22 as well as an identification file 301 associated with the error to the monitoring unit 20. After receipt of the simulated error 300, the agent 22 reports back a corresponding message 302 to the evaluation module 26 of the monitoring unit 20.

A timer 34 serves to monitor the temporal progression 303 of the testing from the generation and sending of the simulated error 300 up to the communication of the agent 22 via the receipt of the simulated error 300 at the monitoring unit 20 over a predetermined time window. The expected reaction, containing the recognition gained from this of the conclusion that the agent 22 operates without error, ensues within a predetermined time window.

In the error association 304 it is checked using a stored encoding of the error whether the error communicated in the step 302 is an actual or a simulated error. This occurs in the monitoring unit 20 by a comparison of the code in the step 302 with the previously sent identification file 301.

In the workflow presented here, the message about the receipt of an error coincides with the identification file 301, such that the command to erase 305 the error message 300 and the further system-internal information connected with this and/or a resetting of the agent 22 to a default setting is enacted by the evaluation module 26 of the monitoring unit 20.

A communication of the error 300 to the system management 28 is not necessary and also does not ensue since it is not an actual error and no further measures are to be introduced.

Figure 4:
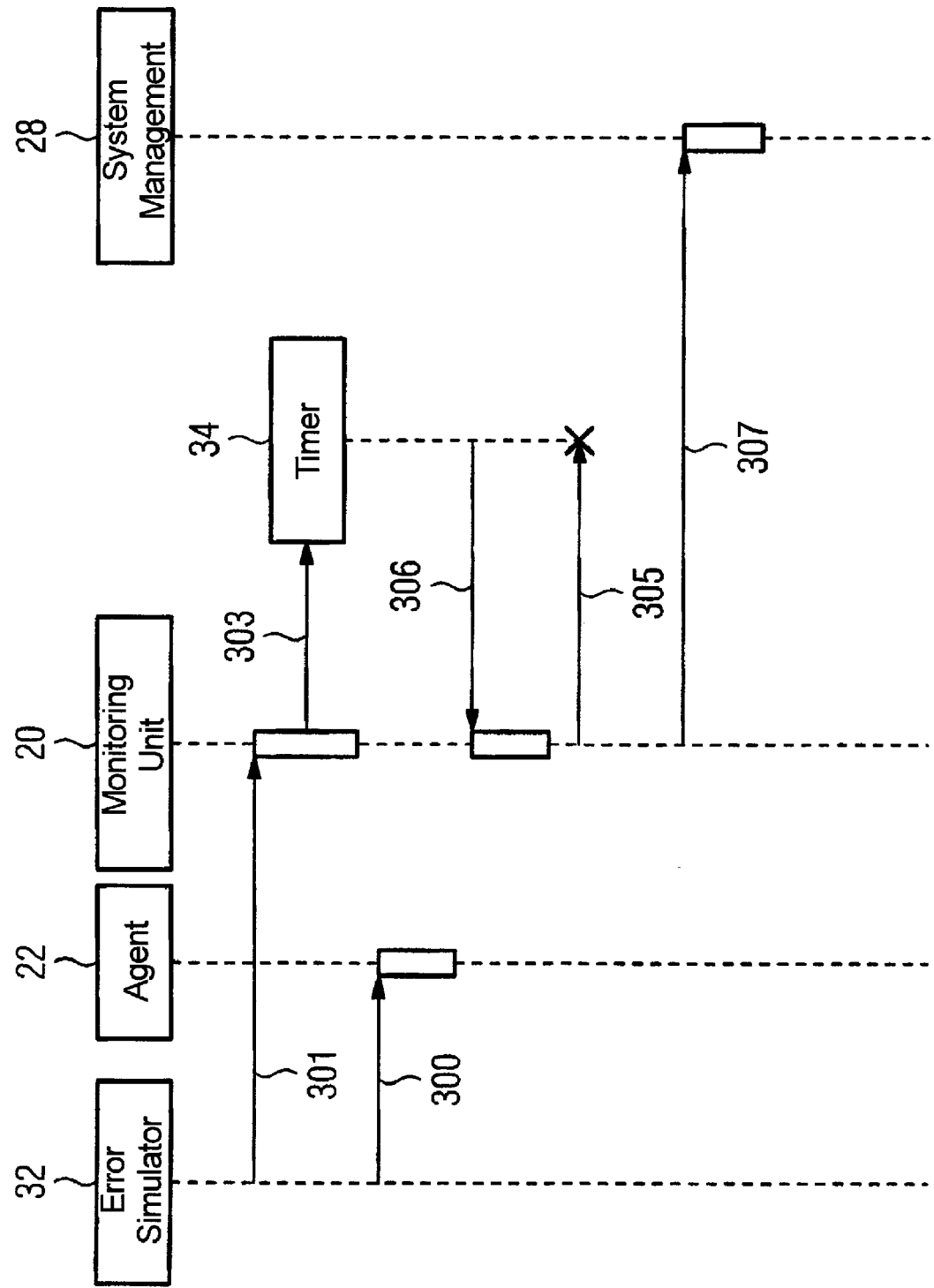
FIG. 4 schematically illustrates the incorrect reaction of an agent.

FIG. 4 shows the workflow of the process given a malfunction of the agent 22. Here as well as a simulated error is sent from the error simulator 32 to the agent and an identification file 301 associated with the simulated error is sent to the monitoring unit 20. The timer 34 monitors the temporal workflow 303 of the process, which timer 34 here registers a temporal overrun in the workflow shown here, thus an overrun of the time span predetermined for the expected response of the agent 22.

A corresponding message about this result of the temporal progression is sent to the monitoring unit 20. In a step 305, the monitoring unit 20 then sends a command to erase the error message 300 and the further system-internal information connected with this and/or of a resetting of the agent 22 to a default setting, as well as a status report 307 to the system management 28 with the determination that the agent 22 is not reacting as expected.

A predetermined reaction of the system management 28 thereupon ensues, which reaction can set in motion further measures, to which belong a restart of the agent 22 in a first step as well as, as of an error count greater than three (thus multiple passes of the testing method with the same negative result), a corresponding message to the system administrator (not shown here).

FIG. 5 shows the eradication of an actual error in the system. The error simulation 32 here generates no error. The agent 22 detects an error during its observation and monitoring of a process and reports this error to the monitoring unit 20 in a step 302.

The monitoring unit 20 initiates the next step provides for this case. In this step (the error association 304), using a stored encoding of the error it is checked whether the error communicated in the error detection and communication 302 is an actual error or a simulated error. This occurs in the monitoring unit 20 via a comparison of the code in the step 302 with the data stored for error types.

If the monitoring unit 20 recognizes an actual error via this comparison, a corresponding error message 308 to the system management 28 ensues, such that from there further measures can be set in motion.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for monitoring functioning of an electronic data processing system, comprising the steps of:

respectively monitoring different functional entities of an electronic data processing system with respective, different agents that are respectively associated with the different functional entities by, through each of said agents, detecting errors in the functioning of the functional entity monitored thereby and generating respective error messages that represent the detected errors; and monitoring each of said agents by sending a simulated error that is designed to cause the agent receiving the simulated error to react by detecting the simulated error as if the simulated error occurred in the functional entity monitored by the agent that received the simulated error, and automatically detecting and evaluating a reaction to the simulated error by the agent that received the simulated error;

placing said agents in communication with a common evaluation module, and transmitting said error messages from all of the respective agents to the common evaluation module, and evaluating said error messages in said common evaluation module; and in said evaluation module, differentiating between an actual error occurring in the functional entity monitored by an agent, and a reaction of the agent to the simulated error sent to that agent.

2. A method as claimed in claim 1 wherein each of said agents has operating specifications associated therewith, and generating the simulated error for each of said agents dependent on the specifications associated with that agent.

3. A method as claimed in claim 1 comprising, in said common evaluation module, ignoring said simulated error and relaying said actual error to a system management unit of said electronic data processing system.

4. A method as claimed in claim 1 comprising, if an agent to which a simulated error does not exhibit an expected reaction to the simulated error, automatically restarting that agent.

5. A method as claimed in claim 4 comprising restarting said agent with a restart procedure that includes resending the simulated error to that agent.

6. A method as claimed in claim 1 comprising sending respective simulated errors to the respective agents at cyclical time intervals.

7. An electronic data processing comprising:
a plurality of functional entities that interact with one another according to a plurality of operating systems and organization programs;
a plurality of agents integrated into one of said organization programs to monitor proper functioning of the respective functional entities, each of said functional entities having one of said agents associated therewith, each of said agents detecting errors arising in the operation of the functional entity associated therewith and generating error messages representing the detected errors; and
a monitoring unit that interacts with each of said agents to monitor proper operation of the respective agents by sending a simulated error to each of said agents that is designed to cause the agent receiving the simulated error to react by detecting the simulated error as if the simulated error occurred in the functional entity monitored by the agent that received the simulated error, and said monitoring unit monitoring a reaction to the simulated error by the agent that received the simulated error;
a common evaluation unit in communication with each of said agents that receives the respective error messages from the respective agents and evaluates said error messages; and
common evaluation module being configured to differentiate between actual errors that occur in said functional entities, and reactions of the respective agents to the simulated errors.

8. An electronic data processing system as claimed in claim 7 wherein said functional entities are operated by said operating systems and organization programs in a client-server architecture.

9. An electronic data processing system as claimed in claim 7 comprising a system management in communication with said common evaluation unit, and wherein said common evaluation unit relays only said actual errors to said system management unit, and wherein said system management unit initiates a response to each of the actual errors relayed thereto.

* * * * *